W. HASLUP.
VEHICLE WHEEL.
APPLICATION FILED MAR. 17, 1909.

977,737.

Patented Dec. 6, 1910.
2 SHEETS—SHEET 1.

WITNESSES:
Minert H. Linderman
A. E. Mahan

William Haslup INVENTOR.
BY
Kerr, Page, Cooper & Hayward ATTORNEYS.

THE NORRIS PETERS CO., WASHINGTON, D. C.

W. HASLUP.
VEHICLE WHEEL.
APPLICATION FILED MAR. 17, 1909.

977,737.

Patented Dec. 6, 1910.
2 SHEETS—SHEET 2.

WITNESSES:

William Haslup INVENTOR.

BY

Kerr, Page, Cooper & Hayward ATTORNEYS.

THE NORRIS PETERS CO., WASHINGTON, D. C.

UNITED STATES PATENT OFFICE.

WILLIAM HASLUP, OF SIDNEY, OHIO, ASSIGNOR TO SIDNEY STEEL SCRAPER COMPANY, A CORPORATION OF NEW JERSEY.

VEHICLE-WHEEL.

977,737.  Specification of Letters Patent.  Patented Dec. 6, 1910.

Application filed March 17, 1909. Serial No. 484,054.

*To all whom it may concern:*

Be it known that I, WILLIAM HASLUP, a citizen of the United States, residing at Sidney, county of Shelby, Ohio, have invented certain new and useful Improvements in Vehicle-Wheels, of which the following is a full, clear, and exact description.

This invention relates to improvements in vehicle wheels, and one of the principal objects is to provide a wheel of such construction as to prevent the spokes from working loose at the hub. In addition it is the purpose of the invention to produce a wheel of strength and durability which shall be capable of ready assembling and shall be sufficiently tensioned and run true.

With these and incidental objects in view, the invention comprises the construction and the combination of parts of which a preferred form of embodiment is shown in the appended drawings.

Figure 1:
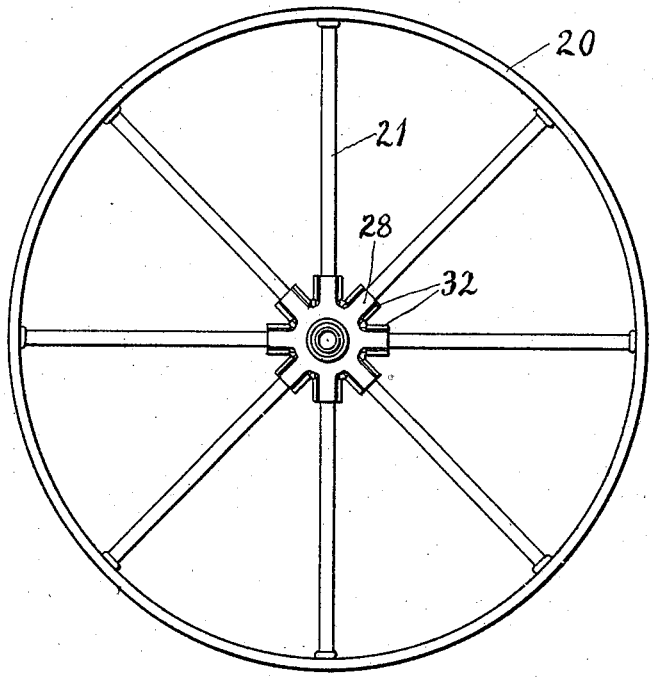
Figure 2:
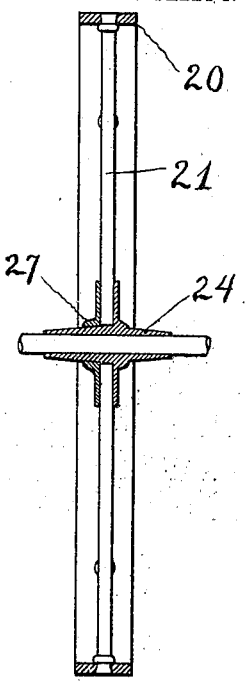
Figure 3:
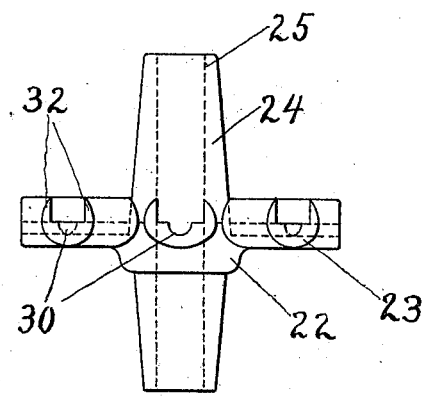
Figure 4:
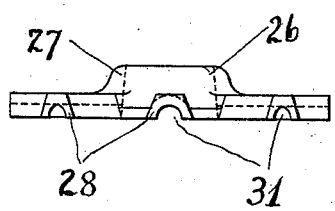
Figure 5:
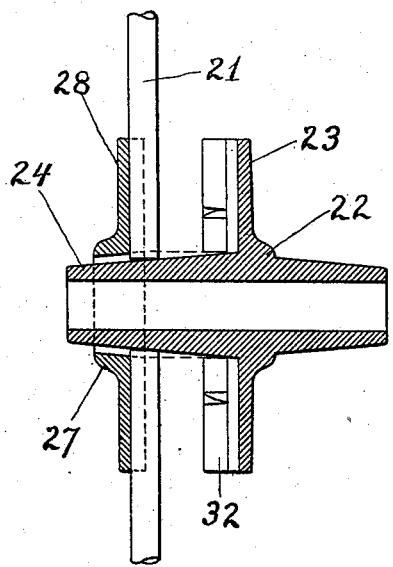
Figure 6:
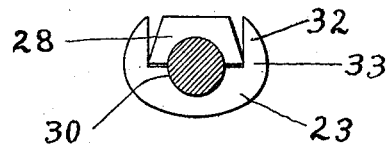
Figure 7:
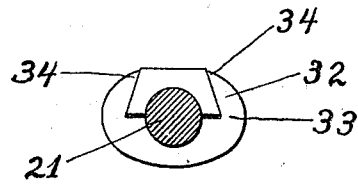
Figure 8:
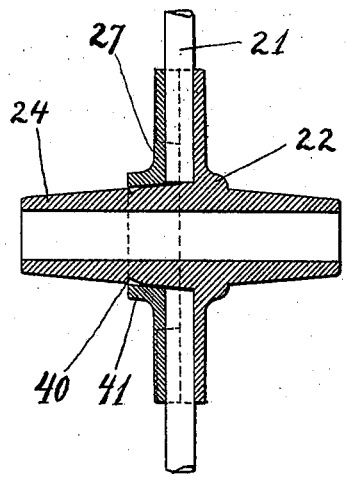
Figure 9:
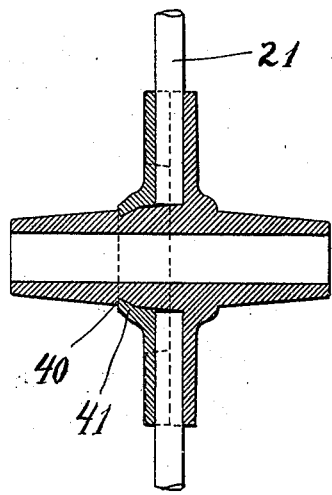

Of said drawings, Figure 1 represents a side view of the wheel containing my improvements. Fig. 2 represents a sectional view of the same. Figs. 3 and 4 represent side views of the two sections of the hub. Fig. 5 represents a sectional view through the hub showing the two parts of the hub slightly separated. Figs. 6 and 7 represent details of the radial arms of the hubs for clamping the spokes. Figs. 8 and 9 represent sectional views of a modification for locking together the two sections of the hub.

The particular form of wheel herein adopted as embodying my invention is a metal wheel such as is now utilized for wheel-barrows and agricultural vehicles. The hub of the wheel is formed in two sections. In wheels of this sort, one of the great difficulties heretofore experienced has been that the strain and the working of the spokes in their hub sockets causes them to become loose and this of course is injurious to the stability and efficiency of the wheel. This difficulty I have aimed to overcome in my present improvements.

Referring to said drawings, the wheel comprises the usual rim 20 to which are riveted or otherwise secured the outer ends of the spokes 21. The inner ends of the spokes are fastened to the hub by having the hub formed in two sections which are interlocked and clamp the spokes between them.

In Fig. 3 is shown the first section 22 of the hub, this section having radial arms 23 extending therefrom, one arm for each of the spokes, as shown in Fig. 1. This section of the hub is formed with an axial extension 24 which tapers as shown in Fig. 3 and is cored through the center as at 25 to receive the axle of the wheel which may be secured to this portion of the hub in any desired manner. This taper extension 24 is of course circular in cross section and projects through the correspondingly tapered central portion 26 of the second section 27 of the hub, as shown in Fig. 4. The second section 27 is likewise formed with a plurality of radial arms 28 corresponding in number to the number of spokes. These two sections of the hub are arranged to be forced together so that their radial arms are made to engage and clamp the spokes between them, as shown in Fig. 2. The radial arms 23 of the first hub section are recessed radially to form a half cylindrical groove 30 to receive the spokes and the radial arms 28 of the other hub section are likewise formed with similar radial grooves, 31, so that the cylindrical inner ends of the spokes will be clamped in between these sections. Each of the aforesaid radial arms 23 of the hub section 22 is provided with clamping portions or projections 32 (see Figs. 36 and 7) and in the preferred form which I have adopted for this wheel, these hub sections are made of malleable metal so that these clamping projections 32 may be bent inwardly under pressure to clamp against the opposite sides of the radial arms 28 of the other hub section, and thus lock the two hub sections together and at the same time firmly clamp the spokes in between these sections. For the better accomplishment of this form of clamping, the radial arms 28 have their sides beveled for the engagement of the clamping portions 32 of the other half of the hub. In Fig. 6 the two radial arms 28 and 23 are shown united prior to the bending inward of the clamping portions 32 and in Fig. 7 these clamping portions 32 are shown bent inward against the beveled sides of the upper radial arm 28. It will be seen from this construction that the inner side of the arm 28 and the beveled sides of this arm form acute angles so that it results from such angular formation that when the clamping portions are bent over, the clamping pressure is mainly exerted at what may be termed the base 33 of the said clamping projections. That is, this practically brings the fulcrum of the clamping pressure at the base of these clamping projections 32 and thus more firmly holds the parts clamped together. When the spokes are thus clamped in place, the lateral strain on the spokes in the use of the wheel tends to work the spokes loose in their sockets by spreading apart the clamped portions. But by having the fulcrum of the clamping pressure exerted at the base of these clamping projections, this results in a very firm grip of the clamping projections against the inclosed radial arms 28. If the pressure caused by the spoke in trying to work loose from its socket were exerted only at the upper ends 34 of these clamping projections, there would be leverage enough to make it much easier to spread these clamping projections apart and thus loosen the spoke in its socket, whereas with the main pressure directed at the base of these clamping projections, because of this peculiar construction, this difficulty is removed and a very firm and secure clamping arrangement is provided. When the parts are in the clamped position, as shown in Fig. 7, it will be seen that the radial spoke arms of the hub are dovetailed into each other and clamp their respective spokes therebetween. Furthermore, it will be obvious that from this construction the radial arms of one of the hub sections clamp over the respective radial arms of the other hub section, and thus serve to lock the two hub sections together and at the same time clamp the spokes between them.

It may be stated that the spokes themselves might at their inner hub-ends be formed in cross section similar to the beveled radial arm 28 so as to make the spoke itself take the place of this arm so far as its clamping peculiarity is concerned. In such event the other radial arm, by its clamping projections 32, would clamp directly against the spokes themselves, but this angularity or the beveled arrangement would still be present so as to bring the fulcrum of the clamping pressure at the base of these clamping portions and thereby secure this beneficial result. It is desired to state that such a construction would come within the scope of my present invention. The radial arms 28, formed in the manner described, constitute clamped members which are clamped by the radial arms of the hub section 22 and such clamped members may be either the inner ends of the spokes themselves or they may be attached to and forming part of the other hub section or they may be separate from such other hub section.

In the assembling of this wheel I make use of an additional advantageous feature in the aforesaid tapered axial extension 24. After the spokes have been put into the rim, they are seated within the radial arms of the hub section 27, as shown in Fig. 5, and the tapered extension 24 of the hub section 22 is inserted through the center of the hub section 27 so that the inner ends of the spokes are seated upon the tapered extension. The parts shown in Fig. 5 represent the two hub sections slightly separated, and as soon as the parts have been partially assembled in this manner, the two hub sections are pressed together from opposite sides so as to bring the two confronting sections together and clamp the spokes therebetween in the manner shown in Fig. 6. In this movement of bringing the two hub sections together, the inner seated ends of the spokes are forced along the gradually enlarging portion of the tapered extension so as to force the spokes outward and thus put stress on the rim in order to tension it sufficiently. This tapering construction need only be very slight of course to produce this effect. Thus the hub section 27 serves as an intervening block bearing upon the spokes and upon which block the pressure may be exerted to force the spokes into place and hold them in position while so doing. At the same time that this pressure is exerted to bring the two hub sections together, and force the spokes outward as stated, lateral pressure is likewise brought to bear upon the clamping projections 32 so as to clamp them over the radial arms of the other hub section, in the position shown in Fig. 7. The result is that the simultaneous application of these pressures clamp the spokes in place firmly and also tensions the wheel rim all at one time and locks the two hub sections together. It will thus be seen that this is not the mere use of an old taper construction with mere clamping of a single hub section over the spokes, but involves the novel use of the second hub section to bring the spokes into place, and tension them, and then clamp and lock these two hub sections together. It is to be understood that the aforesaid construction of the wheel hub may be utilized without making use of this tapered extension construction.

In Figs. 8 and 9 I have shown a modification which affords an auxiliary means for locking together the two hub sections. The tapered extension 24 of the hub section 22 is provided with a shoulder 40 which may be formed by cutting a groove circumferentially around the tapered extension. This shoulder is in proximity to the rim 41 of the other hub section 27 so that after the parts are pressed together in the manner described, the rim 41 of the hub section 27 may be bent inward to lock into said shoulder, thus firmly locking the two hub sections together. By such a swaging operation, the two parts of the hub are held together so as to give still greater security against working loose, but it is to be understood that while this form is an additional locking means for this purpose it is not essential in coöperation with the other construction and may be dispensed with. The said shoulder 40 need of course be very small for this purpose and even may be formed by a projecting rim instead of a groove, with the other hub section forced down over this rim and then swaged in under the shoulder.

While the construction shown and described is one which I have found particularly advantageous for accomplishing the results desired, yet it is to be understood that such is only the preferred form which I have adopted and various other forms may be used without departing from the spirit of my invention and still coming within the scope of the claims which follow.

What I claim is as follows:

1. In a vehicle wheel, the combination with the rim and spokes, of a hub having radial arms formed with spoke-clamping portions; with clamped members having beveled sides engaged by said clamping portions for holding the spokes in place.

2. In a vehicle wheel, the combination with the rim and spokes, of a hub having radial arms formed with spoke-clamping portions; with clamped members contained between the respective clamping portions of said arms, the engaging surfaces of said arms and said clamped members being angularly formed to bring the fulcrum of the clamping pressure at the base of said clamping portions.

3. In a vehicle wheel, the combination with the rim and spokes, of a hub having radial spoke-arms provided with dovetail clamping means having flattened inner surfaces and engaging the spokes to secure the same in fixed relation to the hub.

4. In a vehicle wheel, the combination with the rim and spokes, of a hub formed in two sections adapted to be held together; radial arms extending from one of said sections and having clamping projections; and clamped members for each arm to inclose the spokes therebetween and having beveled sides engaged and clamped by the clamping projections of said arms.

5. In a vehicle wheel, the combination with the rim and spokes, of a hub formed in two confronting sections, one of said sections being formed with radial arms having clamping projections; clamped members for each arm to inclose the spokes therebetween and having beveled sides engaged and clamped by the clamping projections of said arms; an axial extension for one of said hub sections, extending through the other section; and means for locking the latter section to said axial extension.

6. In a vehicle wheel, the combination with the rim and spokes, of a hub formed in two confronting sections and each section having radial spoke-arms to inclose and hold the spokes; an axial extension for the first section, extending through the second section; with a circumferential shoulder formed upon said extension in proximity to the rim of the second section for locking the latter in position.

7. In a vehicle wheel, the combination with the rim and spokes, of a hub formed in two interlocking sections, each of said sections having radial arms and one of said sections having its arms formed with clamping projections to lock over the respective radial arms of the other section and clamp the spokes therebetween; with a tapering axial extension projecting from one section through the center of the second section and forming a seat for the inner ends of the spokes, whereby simultaneous pressure upon opposite sides of said sections and upon said clamping projections will force the spokes outward along the taper seat and at the same time clamp the two sections together firmly over the spokes.

In testimony whereof I affix my signature in the presence of two subscribing witnesses.

WILLIAM HASLUP.

Witnesses:
H. WAGNER,
TAYLOR CUMMINS.